United States Patent [19]
DeLuca et al.

[11] Patent Number: 4,935,735
[45] Date of Patent: Jun. 19, 1990

[54] SELECTIVE CALL RADIO RECEIVER SILENT ALERT MODE ENTRY SYSTEM

[75] Inventors: Michael J. DeLuca, Boca Raton; William G. Siegel, Plantation, both of Fla.; Kazushige Sakou, Urawa, Japan

[73] Assignee: Motorola, Inc., Schaumburg, Ill.

[21] Appl. No.: 824,909

[22] Filed: Jan. 31, 1986

[30] Foreign Application Priority Data

Jan. 31, 1985 [JP] Japan ............................ 60-017598

[51] Int. Cl.[5] ............................................ H04Q 7/00
[52] U.S. Cl. ............................ 340/825.44; 340/311.1
[58] Field of Search ............... 340/825.44, 311.1, 326; 455/38, 31, 32

[56] References Cited

U.S. PATENT DOCUMENTS

| | | | |
|---|---|---|---|
| 4,249,165 | 2/1981 | Mori | 455/38 |
| 4,392,135 | 7/1983 | Ohyagi | 455/38 |
| 4,412,217 | 10/1983 | Willard et al. | 340/825.44 |

FOREIGN PATENT DOCUMENTS

| | | | |
|---|---|---|---|
| 836498 | 4/1952 | Fed. Rep. of Germany | 340/825.44 |
| 2116340 | 9/1983 | United Kingdom | 340/825.44 |
| 2146153 | 4/1985 | United Kingdom | 340/825.44 |

OTHER PUBLICATIONS

"Instruction Manual 68P81020C75-0", Motorola, Inc., Mar. 31, 1980.

*Primary Examiner*—Donald J. Yusko
*Attorney, Agent, or Firm*—Vincent B. Ingrassia; Anthony J. Sarli, Jr.

[57] ABSTRACT

A selective call personal paging radio receiver has audio and visual means to alert the user when he or she receives a selective call transmission. The audio alerting means has low and high volume modes and a three position slide switch selects either the low volume, high volume, or power OFF modes. The switch also has an integral momentary contact push switch function. When the switch is moved from the OFF position to either the low or high volume mode and the push switch function is activated within a first predetermined time after the switch is moved and maintained activated for a second predetermined time, a distinctive alert sequence is generated and then the silent alert mode is entered. In the silent alert mode, the audio alerting means is disabled and the visual alerting means remains active.

3 Claims, 2 Drawing Sheets

SELECTIVE CALL RADIO RECEIVER SILENT ALERT MODE ENTRY SYSTEM

BACKGROUND OF THE INVENTION

This invention relates to the field of selective call radio receivers and more particularly to selective call personal paging radio receivers that have audio and visual alerting means.

In selective call radio paging systems, in particular those that store messages somewhere in the system for later communication to the recipient, each personal paging receiver ("pager") must be provided with some means to alert the pager user that a message is available. When a selective call transmission is received, the user is typically alerted by an audible alert tone or by a visual indication, such as a flashing light. Both audio and visual alert, however, have certain advantages and disadvantages. With audio alert the user is instantly aware that a message is available the moment the pager is selectively called, while with visual alert the user will only be aware of the message when he or she looks at the pager and observes the visual indication. On the other hand, audio alert can be annoying, especially to other people within listening range of the pager, while visual alert rarely interferes with conversations and meetings.

To enjoy the advantages of both audio and visual alert, prior part paging systems sometimes incorporate both into one pager. An extra switch is then added so that the user can select either audio and visual alert or visual alert only. The position of this extra switch then indicates the mode of operation of the pager. When only visual alert is selected, the pager is said to be operating in the "silent alert mode".

There are several disadvantages to such a prior art pager. The addition of the extra switch adds mechanical complexity to the pager and increases its cost. Furthermore, the recent market trend has been to reduce the overall size and weight of the pager. The addition of an extra switch, however, only adds to the pager's weight and requires additional space to mount the switch.

SUMMARY OF THE INVENTION

An object of the invention is to provide an improved selective call radio receiver.

Another object of the invention is to provide a pager that incorporates a multiplicity of functions into one switch.

A more specific object of the invention is to provide a pager that has a single switch that enables the functions of power OFF, low volume audio alert, high volume audio alert, and silent alert mode with a positive indication of all functions.

Briefly, in one embodiment of the invention a selective call radio receiver includes a switch that has first and second positions and a momentary contact push switch function. An audio alert means is also included for generating an audible alert tone. Circuitry for selectively disabling the audio alert means is connected to the switch and the audio alert means. The audio alert means is disabled when the switch is moved from the first to the second position and the momentary contact push switch function is activated within a first predetermined time after the switch is moved.

In another embodiment a selective call personal paging receiver, for receiving selective call transmissions directed to the paging receiver, includes a switch having at least first, second, and third positions and a momentary contact push switch function. An audio alert means generates an audible alert in response to the selective call transmission. The audio alert means has low and high volume modes wherein the low volume mode is selected when the switch is in the second position and the high volume mode is selected when the switch is in the third position. Also included is a visual alert means for generating a visual indication in response to the reception of a selective call transmission. Circuitry for selectively disabling the audio alert means i-s connected to the switch, the audio alert means, and the visual alert means. The audio alert means is disabled under the following conditions: the switch is moved from the first position to the second or third position, the push switch function is activated within a first predetermined time after the switch is moved, and the push switch function is maintained activated for a second predetermined time.

DESCRIPTION OF THE PREFERRED EMBODIMENT

Figure 1:
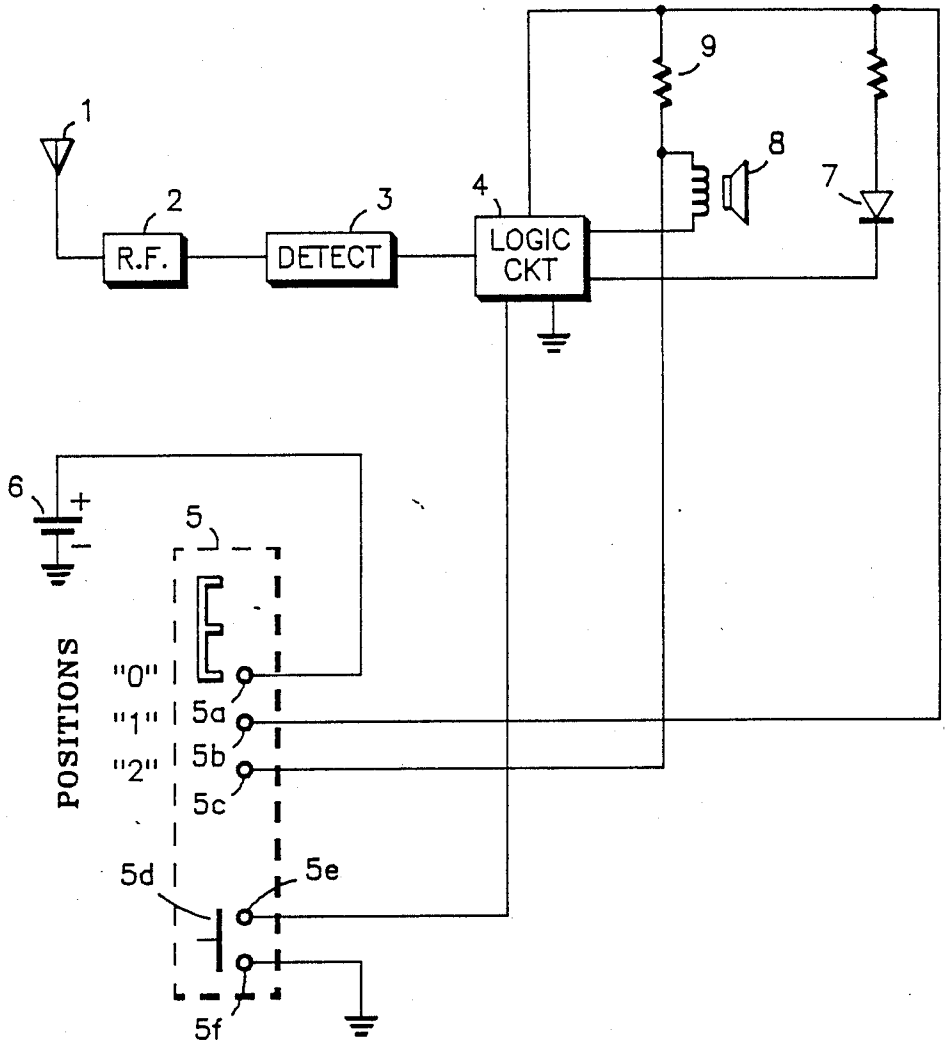
FIG. 1 is a block diagram of a pager illustrating the multi-function alert mode switch.

FIG. 1 shows the construction of a receiver employing the present invention. Illustrated are an antenna 1, a high frequency stage 2, a detector stage 3, a logic circuit 4, a 3-contact slide switch with non-locking push switch function 5, a power source or battery 6, a light emitting diode ("LED") 7, a loud speaker 8, and a current limiting resistor 9 for low volume.

The 3-contact slide switch 5 with non-locking push switch function (hereinafter simply referred to as the switch) operates as described below:

Position 0 : pager OFF
Position 1 : pager ON, low volume mode
Position 2 : pager ON, high volume mode Radiowaves sent from a transmitting station are received on the antenna 1, and directed by way of high frequency stage 2 and detector stage 3 to logic circuit 4. Logic circuit 4 is connected to switch 5, LED 7, loud speaker 8, and battery 6. For the convenience of the user, the alert tone volume can be set in two steps, low volume for a quiet place such as a conference room and high volume for higher ambient noise environments. Furthermore, if the alert tone is not desired, selective calling by way of the flashing LED only (silent mode) can be enabled by disabling the alert tone.

There are three alert modes, high volume alert tone with flashing LED, low volume alert tone with flashing LED, and the silent mode wherein only the LED flashes. The operation of selecting the mode will be described later in reference to FIG. 2.

The use of one 3-contact slide switch 5 with non-locking push switch function can perform both the alert tone selection function and the silent mode entry function. The Silent mode entry is attained upon switching from switch position 0 to switch position 1 or 2. If the 3-contact slide switch 5 is depressed before the alert tone times out, the alert tone is stopped. This is part of the alert tone reset function of the switch. Then, if the 3-contact slide switch is held depressed for more than a predetermined "X" seconds of time, the silent mode is established. This is the silent mode entry function. The pager then sounds an alert tone and flashes the LED to confirm the entry of the silent mode. The silent mode is held until the 3-contact slide switch 5 is reset to the position 0.

In FIG. 1, antenna 1, R.F. stage 2, and detector 3 are interconnected to form the front end of a well known superheterodyne radio receiver. Circuit 4 may contain a microcomputer, preferably a Motorola MC146805H2 microcomputer, and appropriate well known software to perform selective call radio receiver functions. In the alternative, circuit 4 may contain discrete logic circuitry. Circuit 4 also contains a well known bipolar amplifier with an open collector output, which is connected between the microcomputer and speaker 8. Circuit 4, in particular the microcomputer and the speaker bipolar amplifier, and speaker 8 provide an audio alert means for generating an alert tone in response to a received selective call transmission. Circuit 4 can also selectively disable the audio alert means, as will be explained later in connection with the silent mode entry subroutine. Circuit 4 further contains a similar bipolar amplifier, which is connected between the microcomputer and LED 7. Thus, circuit 4 and LED 7 provide a visual alert means for generating a visual indication in response to a received selective call transmission.

The alert tone signal that drives speaker 8 is preferably a 50% duty cycle square wave which is generated by the microcomputer at a preferred frequency of 2660 Hz. Speaker 8 is a well known permanent magnet speaker having a D.C. impedance of about 30 Ohms. The low and high volume mode which are selected by switch 5 are achieved by respectively switching in and out resistor 9, preferably 270 Ohms, which is effectively connected in series with speaker 8 when the low volume mode is selected.

Switch 5 is preferably a 3 position slide switch, although other well known mechanical switch operations, such as rotary operation, are also suitable. Optionally, switch 5 can be labeled to indicate the selected position. Electrically, in the "0" or OFF position, switch terminals 5*a*, 5*b*, and 5*c* are unconnected. In the "1" or low volume position, switch terminal 5*a* is connected to terminal 5*b*, thereby supplying voltage from battery 6 directly to circuit 4 and indirectly to speaker 8 through series resistor 9. In the "2" or high volume position, terminal 5*a* is connected to terminals 5*b* and 5*c*, thereby supplying voltage from battery 6 directly to both circuit 4 and speaker 8. Thus, it can be seen that switch 5 directly controls the low or high volume audio alert tone mode by connecting resistor 9 in series with speaker 8 for the low volume mode and essentially shorting out the resistor in the high volume mode.

Switch 5 also has a momentary contact push switch function 5*d*. The push switch function is mechanically integral with the slide function of the switch. Thus, the momentary contact push switch function 5*d* can be activated by simply depressing the same sliding actuator that is used to select switch position "0", "1", or "2". This is preferably a non-locking momentary contact function so that contacts 5*e* and 5*f* are connected only when the actuator is depressed. Terminal 5*e* of momentary contact push switch function 5*d* is electrically connected to an input port of the microcomputer.

The operation of this invention will now be described by referring to the flow chart shown in FIG. 2 The pager has the 3-position switch wherein the switch positions correspond to the OFF mode at position 0, the low volume mode at position 1, and the high volume mode at position 3. "Start" (step 20) corresponds to switch position 0, in which the pager is kept OFF. Next, switch 5 is tested (step 22) by the logic circuit connected thereto to determine whether it is at position 1 or not. If switch position 1 is not selected, the test (step 22) is repeated. If switch position 1 is selected, the pager proceeds to the test (step 24) for switch position 2. It may be observed that when using a 3 position slide switch with position 1 between positions 0 and 2, position 1 is momentarily selected in moving the switch from position 0 to position 2.

The pager has the possibility for entering the silent mode in the case where either switch position 1 or 2 is selected (low and high volume respectively). The pager then initializes the alert tone (step 26 or 28, low or high volume respectively) and the LED flashing. Next, the pager proceeds to the reset switch operation test (step 30 or 32). If the reset switch is not depressed, the pager proceeds to a decision block (step 34 or 36) that checks whether the alert tone has been completed or not. If the pager has not generated the alert tone a predetermined "K" times, the operation is returned to the reset switch test (step 30 or 32). If the pager has already generated the alert tone "K" times, the pager stops (steps 38 or 40) the alert tone (low or high volume) and the LED flashing. Then, in the next step (42 or 44) the pager enters the audio (low or high volume) and visual alert mode. This is the END (step 46) of the mode entry sequence.

In a case where switch position 1 or 2 is selected (low or high volume respectively) and the reset switch is kept depressed for more than "X" seconds of time (steps 52 or 54), the pager enters the silent mode (steps 56 and 58). After the reset switch is operated for "X" seconds, the pager operation transfers from the decision block (steps 52 or 54) that checks whether the reset switch has been depressed or not for more than "X" seconds to the function block (steps 60 or 62) that sounds an alert tone and flashes the LED. This confirms that the pager has entered the silent mode (steps 56 or 58). This is the "END" (step 46) of the mode selection sequence.

Figure 2:
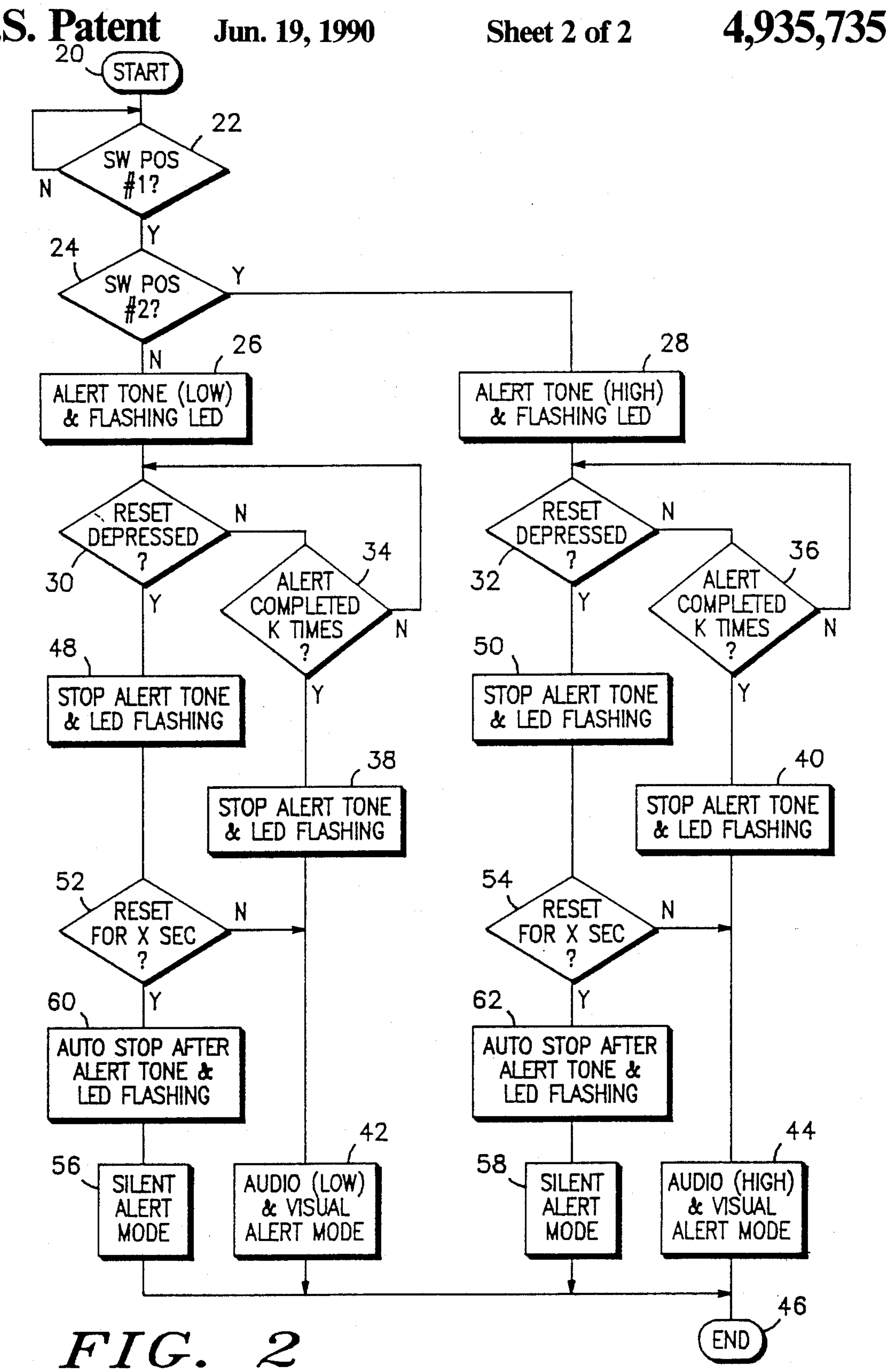
FIG. 2 is a flow chart of the operation of a pager having the multi-function alert mode switch. A portion of the flow chart also illustrates the preferred structure of the microcomputer software necessary to set the alert mode of a pager having such a switch.

A flow chart of the microcomputer software necessary to implement the silent mode entry system is substantially identical to the operational flow chart of FIG. 2. Those skilled in the art will understand from an examination of FIG. 1 that the low and high volume modes are completely controlled by switch 5, and that logic or microcomputer circuit 4 has nothing to do with the selection of low or high volume. A close examination of FIG. 2 shows that after step 24, the operation divides into two almost identical paths, a low volume path consisting of steps 26, 30, 34, 38, 42, 48, 52, 56 and 60, and a high volume path consisting of steps 28, 32, 36, 40, 44, 50, 54, 58, and 62. Since the only difference between these two paths is the volume of the alert tone and the microcomputer doesn't control the volume of the alert tone, the microcomputer software only has to implement one of these flow chart paths.

When switch 5 is moved from position "0" to position "1" or "2", power is applied to logic or microcomputer circuit 4 and a "power on" sequence, which includes the silent mode entry system subroutine, is begun. Because the silent mode subroutine is embedded in the "power on" sequence, the silent mode can only be entered immediately after switch 5 is moved from position "0" to position "1" or "2". Therefore, there is no need for the microcomputer to actually test the position of switch 5, as indicated by steps 20, 22, and 24 of the operational flow chart of FIG. 2.

As previously explained, the low and high volume flow chart paths are identical as far as the microcomputer is concerned. Thus, the flow chart of the microcomputer software for the silent mode entry subroutine can be described in detail by reference to either path. Arbitrarily, the high volume path consisting of steps 28, 32, 36, 40, 44, 50, 54, 58, and 60 will be described.

Shortly after switch 5 is moved from the "0" or OFF position to the low or high volume position a normal power on alert sequence is initiated wherein the microcomputer generates (step 28) an audible alert tone, preferable a 2660 Hz 50% duty cycle square wave, which is directed to speaker 8 through the aforementioned bipolar amplifier. The alert tone is periodically turned ON and OFF, preferably ON for 1.05 secs. and OFF for 0.35 secs. Thus, each alert tone cycle takes about 1.4 seconds. The LED is also flashed ON and OFF, preferably synchronously with the alert tone. In step 32, the microcomputer tests the momentary contact push switch function **5*d* of switch 5 (referred to in FIG. 2 as the "reset" switch) to determine whether it has been depressed (closed). If not, step 36 decides whether the initial alert cycle has been executed "K" times, wherein "K" is preferably 5. If less than "K" alert cycles have been completed, the subroutine returns to step 32** wherein the push switch function is examined again.

If "K" cycles have been completed, the power on alert sequence has also been completed and the subroutine goes to step 40 wherein the initial alert tone and LED flashing are terminated. Thus, effectively the push switch function must be activated within a predetermined time (5 cycles times 1.4 seconds per cycle) after the switch is moved from the OFF position to the low or high volume position. The subroutine then proceeds to step 44 wherein the audio and visual selective call alert mode is entered. In this mode, when the receiver receives a selective call directed to that particular receiver, both the alert tone and flashing LED will be activated to alert the user that he or she has a message.

Returning to step 32, if the push switch function **5*d* is depressed, the subroutine will branch to step 50 wherein the alert tone and flashing LED will be inhibited. In the next step 54, if the push switch function 5*d* is depressed for less than "X" secs., wherein "X" is preferably 1.5 seconds, the subroutine branches to step 44 whereupon, the audio and visual selective call alert mode is entered as previously described. If the push switch function 5*d* is depressed for at least "X" seconds, the program branches to step 62. Step 62 is designed to provide confirmation that the silent alert mode has been entered. Step 62 sounds the audio alert tone and flashes the LED, however, in this step the 2660 Hz alert tone is very short, preferably 77.5 msec., and it is not repeated. The LED is flashed as before, ON for 1.05 secs and OFF for 0.35 secs with a total of five flashes. This constitutes the silent mode entry confirmation. In the following step 58**, the silent alert mode is entered wherein only the flashing LED is activated in response to the receipt of a selective call transmission directed to that particular receiver.

Once the audio and visual alert mode or the silent alert mode has been entered, the push switch function **5*d* can resume its normal function as a reset switch. As a reset switch, the user depresses push switch function 5*d*** to inhibit an audio or visual alert that has been activated in response to a selective call.

Alternate embodiments of the invention are also possible without departing from the essence of the invention. For example, the invention can be practiced with a two position switch, although low and high volume selection would be eliminated. Steps 52 and 54 could also be eliminated, so that the silent alert mode could be entered without the requirement to hold push switch function **5*d*** depressed for "X" seconds.

As described above, the silent mode entry system according to this invention enables the silent alert mode and conventional pager system functions by the use of a3-contact slide switch 5 with non-locking push switch function **5*d***. The system requires no additional switches and can provide a pager having reduced space and cost as well as ease of operation.

We claim:

1. A selective call radio receiver having audible and silent alert modes, comprising in combination:

a switch having first and second positions, said switch having a momentary contact push switch function;

audio alert means for generating an audible alert tone; and circuitry for selectively disabling said audio alert means, said circuitry connected to said switch and said audio alert means;

whereby said silent alert mode is entered wherein said audio alert means is disabled when said momentary contact push switch function is activated within a first predetermined time after said switch is moved from said first to said second position and said push switch function is maintained activated for a second predetermined time.

2. The selective call radio receiver of claim 1, wherein:

said switch has a third position; and said audio alert means has low and high volume modes, wherein said low volume mode is selected when said switch is in said second position and said high volume mode is selected when said switch is in said third position.

3. A selective call personal paging receiver for receiving selective call transmissions directed to said paging receiver and having audible and silent alert modes, said paging receiver comprising in combination:

a switch having first, second, and third positions, said switch having a momentary contact push switch function;

audio alert means for generating an audible alert tone upon entry into said silent alert mode and in response to said selective call transmission, said audio alert means having low and high volume modes wherein said low volume mode is selected when said switch is in said second position and said high volume mode is selected when said switch is in said third position; and circuitry for selectively disabling said audio alert means, said circuitry connected to said switch and said audio alert means;

whereby, said silent mode is entered wherein said audio alert means is disabled when said switch is moved from said first position to one of said second and third positions, said push switch function is activated within a first predetermined time after said switch is moved, and said push switch function is maintained activated for a second predetermined time.

* * * * *